(12) United States Patent
Heinrich et al.

(10) Patent No.: US 10,627,006 B2
(45) Date of Patent: Apr. 21, 2020

(54) VALVE THAT CAN BE ACTIVELY AND PASSIVELY ACTUATED

(71) Applicant: Eagle Actuator Components GmbH & Co. KG, Heppenheim (DE)

(72) Inventors: Ralf Heinrich, Scwegenheim (DE); Daniel Koch, Edingen-Neckarhausen (DE)

(73) Assignee: Eagle Actuator Components GmbH & Co. KG, Heppenheim (DE)

( * ) Notice: Subject to any disclaimer, the term of this patent is extended or adjusted under 35 U.S.C. 154(b) by 0 days.

(21) Appl. No.: 16/122,255

(22) Filed: Sep. 5, 2018

(65) Prior Publication Data
US 2019/0093785 A1 Mar. 28, 2019

(30) Foreign Application Priority Data
Sep. 26, 2017 (DE) .......................... 10 2017 122 253

(51) Int. Cl.
*F16K 31/06* (2006.01)
*F16K 17/04* (2006.01)
*F16K 24/02* (2006.01)
*F16K 24/04* (2006.01)
(Continued)

(52) U.S. Cl.
CPC .... *F16K 31/0675* (2013.01); *B60K 15/03504* (2013.01); *F16K 17/0413* (2013.01); *F16K 24/02* (2013.01); *F16K 24/04* (2013.01); *F16K 31/0655* (2013.01); *B60K 2015/03296* (2013.01); *B60K 2015/03302* (2013.01); *Y10T 137/7794* (2015.04); *Y10T 137/7831* (2015.04)

(58) Field of Classification Search
CPC ...... F16K 31/0675; F16K 24/04; F16K 24/02; F16K 17/0413; F16K 31/0655; Y10T 137/7794; Y10T 137/7831; B60K 2015/03302; B60K 15/03302; B60K 2015/03296
USPC ...... 251/82–83, 129.15; 137/505.11, 505.47, 137/493.1–493.6
See application file for complete search history.

(56) References Cited

U.S. PATENT DOCUMENTS 5,657,962 A * 8/1997 Neron ................ F02M 25/0836
123/520
6,631,881 B2 * 10/2003 Weldon ............. F02M 25/0836
123/516
(Continued)

FOREIGN PATENT DOCUMENTS

CN 201568617 U 9/2010
DE 1926636 11/1970
(Continued)

*Primary Examiner* — John Bastianelli
(74) *Attorney, Agent, or Firm* — Katterle Nupp LLC; Paul Katterle (57) ABSTRACT

A valve is provided having first and second flow channels connected by a passage. A sealing device is operable to open and close the passage to control fluid flow between the first and second flow channels. The sealing device includes a first sealing body and a second sealing body through which the passages extends. The first and second sealing bodies are biased together by a spring to close the passage. The first sealing body is passively movable by fluid and actively movable by an electromagnetic device to open the passage to permit fluid to flow between the first and second passages.

11 Claims, 4 Drawing Sheets (51) Int. Cl.
*B60K 15/035* (2006.01)
*B60K 15/03* (2006.01)

(56) References Cited

U.S. PATENT DOCUMENTS

| | | | | |
|---|---|---|---|---|
| 6,843,271 | B2 * | 1/2005 | Weldon | F16K 24/04 |
| | | | | 123/516 |
| 7,128,089 | B2 * | 10/2006 | Bente | F16K 31/0655 |
| | | | | 137/512.15 |
| 8,469,051 | B2 | 6/2013 | Bittner et al. | |
| 8,789,557 | B2 * | 7/2014 | Muller-Riederer | F16K 24/04 |
| | | | | 137/522 |
| 8,998,167 | B2 * | 4/2015 | Leidig | F16K 31/0655 |
| | | | | 251/83 |
| 9,027,590 | B2 | 5/2015 | Gerlich et al. | |
| 2017/0016552 | A1 | 1/2017 | Schlick et al. | |

FOREIGN PATENT DOCUMENTS

| | | |
|---|---|---|
| DE | 3916639 A1 | 11/1990 |
| DE | 102007025048 B4 | 8/2012 |
| DE | 102011114120 A1 | 3/2013 |
| DE | 102015111561 A1 | 1/2017 |
| JP | H07243542 A1 | 9/1995 |

* cited by examiner

Strom = current
Feder = spring
Kraft = force
Spalt = gap

VALVE THAT CAN BE ACTIVELY AND PASSIVELY ACTUATED

CROSS-REFERENCE TO RELATED APPLICATION(S)

This application claims priority under 35 U.S.C. § 119 to: German Patent Application No.: 10 2017 122 253.7, filed on Sep. 26, 2017, which is herein incorporated by reference.

TECHNICAL FIELD

The present disclosure relates to a valve that is opened and closed by a sealing body that is passively movable by fluid and actively movable by an electromagnetic device.

BACKGROUND

A unit made from a magnetic valve and a passive valve for limiting pressure in a tank is known from DE 10 2007 025 048 A1. In a passive valve, the opening or closing is accomplished only by the pressures that are created by the fluids and applied to the sealing device. A magnetic valve, on the other hand, is a so-called active valve that is opened or closed by an electromagnetic device by a sealing device or a sealing body being actively moved. In the case of a magnetic valve, currents are conducted through a coil in order to create a magnetic field, the magnetic force of which actively moves an armature element. The movement of the armature element is used to actively move a sealing device in such a manner that a sealing seat is opened or closed in order to permit or prevent a fluidic flow.

The passive valve known from DE 10 2007 025 048 A1 has two bodies that can be moved jointly and relative to one another, through whose fluid- or pressure-controlled movement overpressures as well as underpressures in a tank can be eliminated if certain pressure limits are exceeded. The magnetic valve assigned to the passive valve actively regulates the tank pressure within the pressure limits that are allowed by the passive valve.

The passive valve and the magnetic valve have one sealing seat each. Each sealing seat represents a potential leak source so that special care is needed in the choice of seal material. There is a need for as compact and tightly sealed a valve as possible.

The sealing seat of a magnetic valve can be closed or opened via an electromagnetic device. The manner of operation of an electromagnet is generally known and is described in DE 10 2015 111 561 A1, for example, based on a low-noise sealing of a sealing seat against a spring force. There it is taught to design the magnetic force on an armature element to increase overall, so that the latter can execute a stroke against a spring force. It is further taught to continuously increase the current supply of a coil, meaning the conduction of a current through the coil of the electromagnetic device, during the movement of the armature element from an initial position into the end position. The valve is closed in the end position. Relatively high current strengths can be combined with an increased energy usage with this technique.

There is a need for a valve whose current supply is accomplished in as effective, yet low-noise a manner as possible.

It is therefore desirable to reduce over- and underpressures, in particular with a valve that can be operated actively and passively, as effectively and reliably as possible, but also in as low-noise a manner as possible.

SUMMARY

In accordance with the disclosure, a valve is provided having a first flow channel and second flow channel. A sealing device connects the first and second flow channels in a fluid-conducting manner and separates the first and second flow channels from one another in a fluid-blocking manner. The sealing device has at least one moveable sealing body for opening and closing a passage. The sealing body has a fluid engagement surface for fluid-controlled and, thus, passive movement of the sealing body for opening or closing of the passage. An electromagnetic device is provided for actively moving the sealing body to open or close the passage.

Also provided in accordance with the present disclosure is a method for gradually opening and/or closing a valve that has an electromagnetic device with a coil for creating magnetic forces. The electromagnetic device has an armature element that can be moved along a stroke displacement against spring forces of a spring. In accordance with the method, at least one current is applied to the coil. A current strength (I) of the current creates a magnetic force that is equal to the opposing spring force at a specific stroke position of the armature element. The current applied to the coil is made to overshoot and/or undershoot the current strength (I).

BRIEF DESCRIPTION OF THE DRAWINGS

The features, aspects, and advantages of the present disclosure will become better understood with regard to the following description, appended claims, and accompanying drawings where:

DETAILED DESCRIPTION OF ILLUSTRATIVE EMBODIMENTS

According to the disclosure, it has first been recognized that the valve must open passively, meaning only when pressures are exceeded, for effective reduction of pressures. To do this, at least one moveable sealing body having a fluid engagement surface that can open a passage is necessary. This sealing body can automatically execute movements without the application of electrical currents and can therefore be moved in a relatively low-noise manner within the valve.

It is further known that, in order to minimize the number of sealing seats, this sealing body must be able to be actively operated independent of the pressures exerted upon it. For this purpose, an electromagnetic device is provided, by means of which the aforementioned sealing body can be moved not only actively, but also passively for opening or closing the passage.

By the choice of appropriate current strengths, a part of the electromagnetic device, and thus the sealing body, moves as slowly as possible and is freed from undesired accelerations. Undesired noises are also prevented by this.

In this manner, a single valve having only one sealing seat that can be opened and closed unites a passive and an active valve function. In this manner, installation space, weight and expense can be saved in the manufacturing. The use of only one sealing seat ensures, in particular, that there is only a very low potential for leakage.

The sealing body could be moved relative to the electromagnetic device or to parts thereof. Alternately or additionally, the sealing body could be decoupled from the electromagnetic device or from parts thereof at least in sections. Both have the effect that the sealing body can be moved independently of the movement of the electromagnetic device or of movements of parts thereof. The sealing body is therefore a component of the valve that can automatically remove pressures passively and can optionally also be operated actively.

The electromagnetic device could have a coil and an armature element that can be actively moved and by which the aforementioned sealing body can be directly or indirectly moved when a magnetic field is generated. By conducting a current through the coil, it generates a magnetic field that produces a magnetic force. The magnetic force can move the armature element. The armature element can affect the sealing body and push it away from a sealing seat in order to open a passage. It is also conceivable to design the armature element and the sealing body as one piece.

The armature element could engage directly or indirectly into a recess in the sealing body by means of a rod element. The rod element can engage by means of the magnetic circuit of the electromagnetic device, in particular by the coil, if the armature element and the sealing body are located on different sides of the coil.

The rod element can additionally be loosely guided within the recess in the manner of a telescope and only entrain the sealing body or push it away from the sealing seat in one direction of movement, specifically if the rod element comes to rest against an interior stop of the recess. In this manner, the sealing body can be moved detached from the rod element. Advantageously, the sealing body can be actively moved in only one direction by the rod element or the electromagnetic device.

In this context, the aforementioned sealing body could be movable by the electromagnetic device against the spring force of a spring. Alternately or additionally, the sealing body could be removable from the passage by the electromagnetic device. If an overpressure acts upon the fluid engagement surface of the sealing body on the side of the armature element on the sealing body, the latter can be moved passively against the spring force and relative to the armature element and open the passage. After the reduction of the overpressure, the sealing body is passively pulled against the sealing seat by the spring in order to close the passage. Even if the sealing body is actively moved away from the passage by the electromagnetic device, the spring ensures that the sealing body returns to the sealing seat if the current strength in the coil decreases.

The sealing device could have the aforementioned first sealing body and a second sealing body, wherein the two sealing bodies are movable relative to each other. In this manner, the sealing bodies can reciprocally lift from the sealing seat and passively reduce a pressure totally dependent upon which pressure is stronger in which flow channel and which fluid engagement surfaces effectively become active.

The two sealing bodies could be pressed against each other by a or the aforementioned spring and the passage could be openable by means of distancing of the sealing bodies from one another and closable by contact between the sealing bodies. In this manner it is ensured that the passage is again closed after the reduction of a pressure.

The sealing device could have only one openable sealing seat, at which the sealing bodies abut each other to close the passage.

In this manner, the leakage potential after the valves are manufactured is minimized. In addition, the sealing device having a flat design, meaning having a wider structure in the radial direction than in the axial, can facilitate a compact design of the valve. The sealing device is preferably designed like a plate or dish.

A sealing device that comprises two sealing bodies can also be movable as a whole in order to reciprocally come to rest against stops. Specifically, the sealing bodies could reciprocally come to rest against stops in order to distance them from one another.

The second sealing body could comprise a rolling diaphragm, or be designed as such, wherein the second sealing body abuts or can abut a support shoulder in a manner that prevents movement so that the first sealing body can be moved relative to the second sealing body and can be removed from it. The first sealing body could thus abut or be abutable against a stop so that the second sealing body can be moved relative to the first sealing body and can be removed from it. A reciprocal movement of the sealing bodies in different directions is thus possible.

A rolling diaphragm ensures that the second sealing body only moves away from the sealing seat or from the first sealing body by a defined distance. If the rolling diaphragm is rolled up, it can only be minimally stretched. The rolling diaphragm is preferably manufactured from an elastomer.

The valve described here is used as a tank-pressure regulation valve. Such a valve is described as a FTIV (fuel tank isolation valve).

The valve described here can also be opened actively by an actuator, in particular a linear magnet actuator.

The method described here is preferably executed using a valve of the type described here. In this manner, a low-noise and effective operation of the valve is possible. Each of the technical features illustrated or described in the drawings and in the claims can be realized individually or in combination with other technical features in the valve with which the method is executed.

Figure 1:
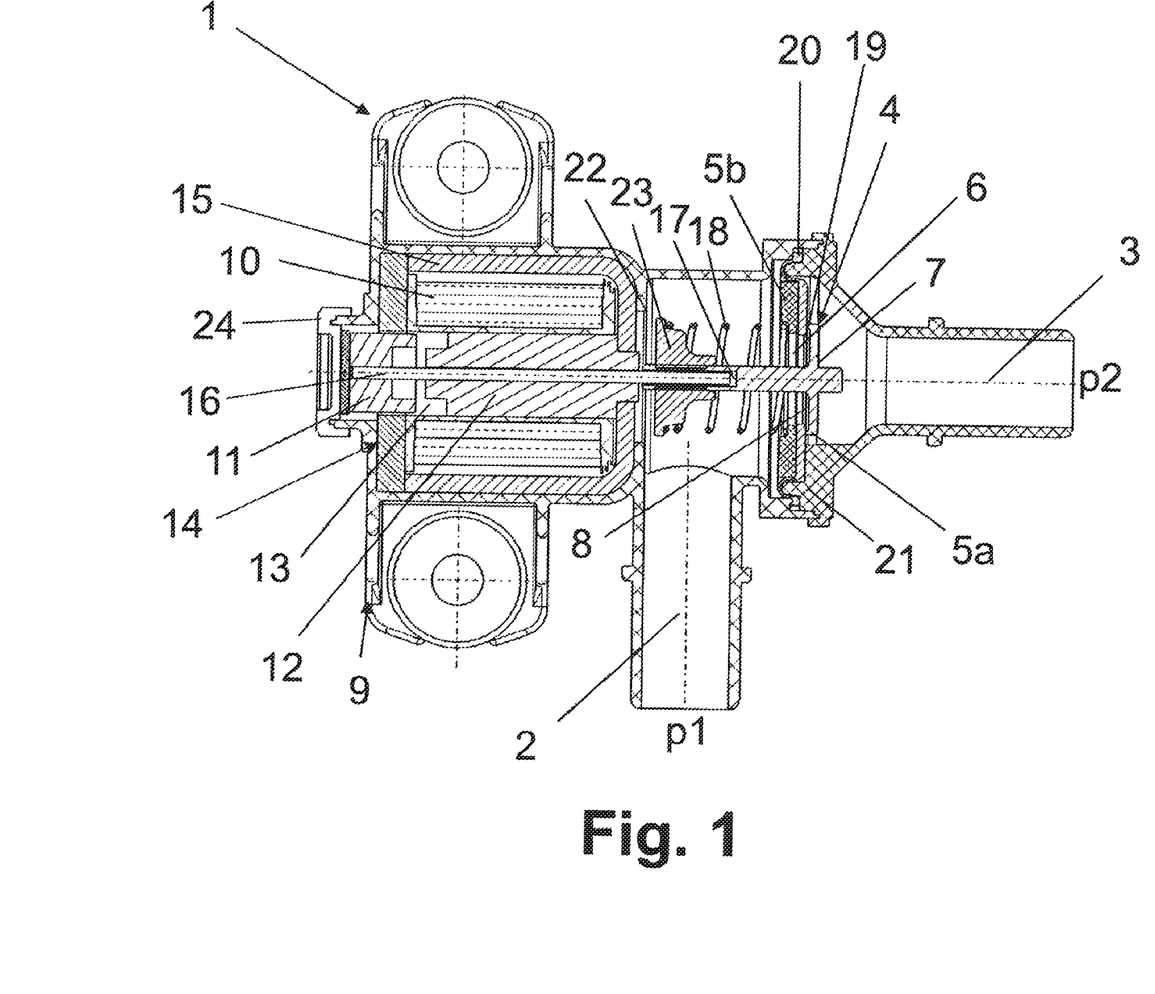
FIG. 1 shows an electromagnetically operable valve in a state, in which no current flows through the coil, meaning that the valve is in a currentless and closed state.

FIG. 1 shows a valve 1 comprising a first flow channel 2, a second flow channel 3 and a sealing device, 4, through which flow channels 2, 3 can be connected to each other in a fluid-conducting manner and can be separated from each other in a fluid-blocking manner.

Sealing device 4 has at least one movable sealing body 5*a* for opening or closing a passage 6, wherein sealing body 5*a* has a fluid engagement surface 7, 8 for fluid-controlled, and thus passive, movement of sealing body 5*a* to open or close passage 6.

An electromagnetic device 9 is provided by means of which aforementioned sealing body 5a can also be moved actively for opening or closing passage 6.

Sealing body 5a can be moved relative to electromagnetic device 9 or parts thereof and is detached from electromagnetic device 9 or parts thereof at least in sections, so that it can be moved in a fluid-controlled manner independently from the movement of electromagnetic device 9 or from the movements of parts thereof.

The electromagnetic device 9 could have a coil 10 and an actively movable armature element 11 by which the aforementioned sealing body 5a can be directly or indirectly moved when a magnetic field is generated.

Electromagnetic device 9 further has a pole core 12, from which armature element 11 can be distanced by a gap 13 or a stroke or a stroke displacement. Electromagnetic device 9 has a magnetic circuit 14, wherein pole core 12 and armature element 11 are parts of magnetic circuit 14. Coil 12 is enclosed by a metallic sheath 15 in order to guide magnetic field lines.

When coil 10 is energized, armature element 11 is pulled against pole core 12 by a magnetic force and gap 13 is reduced.

Armature element 11 engages directly into a recess 17 of sealing body 5a by means of a rod element 16. Sealing body 5a extends through passage 6 in order to interact with rod element 16, wherein it faces toward second flow channel 3 with a plate-like engagement surface 7 that overlaps passage 6 in a sealing manner.

Aforementioned sealing body 5a can be moved and removed from passage 6 by electromagnetic device 9 against the spring force of spring 18. The aforementioned magnetic force is oriented counter to the spring force.

Figure 2:
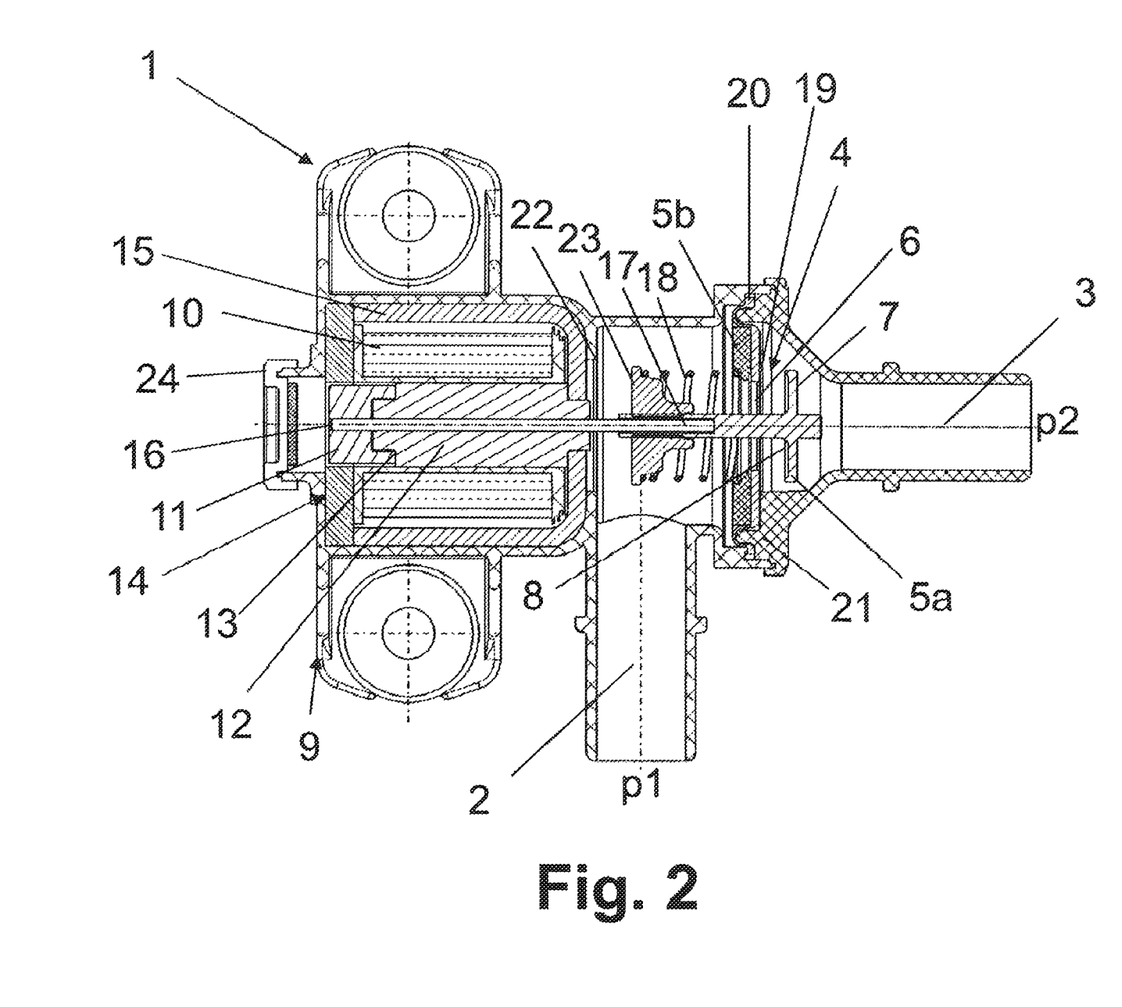
FIG. 2 shows the electromagnetically operable valve according to FIG. 1 in a state, in which the current flows through the coil, meaning that the valve is in a state supplied with current and open.

FIG. 2 shows valve 1 in an opened state if the magnetic force has overcome the spring force and valve 1 is actively opened.

Sealing device 4 has the aforementioned sealing body 5a and a second sealing body 5b, wherein the two sealing bodies 5a, 5b can be moved relative to one another. Sealing device 4 is built flat, but extends further in the radial direction than in the axial direction. Sealing device 4 is designed as a plate or dish shape.

The two sealing bodies 5a, 5b are pressed against each other by spring 18. Passage 6 can be opened by the displacement of sealing bodies 5a, 5b from one another and can be sealed by the contact between sealing bodies 5a, 5b.

Sealing device 4 therefore has only one openable sealing seat 19, at which sealing bodies 5a, 5b abut each other to close passage 6.

Second sealing body 5b comprises a rolling diaphragm 20, wherein second sealing body 5b having rolling diaphragm 20 abuts or can abut a support shoulder 21 in a manner that prevents movement so that first sealing body 5a can be moved relative to second sealing body 5b and can be removed from it. Support shoulder 21 has a protruding rim rounded off in the direction of spring 18, around which rolling diaphragm 20 can be placed and to which it can conform.

As shown in FIGS. 1 and 2, spring attachment 23 abuts or can abut a stop 22 in a manner that prevents movement of the first sealing body 5a, so that second sealing body 5b can be moved relative to sealing body 5a and removed from it.

First sealing body 5a is firmly connected to a spring attachment 23. Spring attachment 23 is not longitudinally movable with respect to sealing body 5a, so that spring attachment 23 in FIG. 1 abuts stop 22 and first sealing body 5a thus indirectly abuts stop 22.

Spring 18 is supported on one end by spring attachment 23 and on the other end by second sealing body 5b, which, in turn, abuts support shoulder 21. In this manner, first sealing body 5a is pulled against second sealing body 5b by spring 18 in order to close passage 6. Second sealing body 5b is pressed against support shoulder 21 by spring 18.

Passage 6 is formed in second sealing body 5b. In this respect, sealing device 4 comprises not only one sealing seat 19, but also only one passage 6.

Second sealing body 5b can be moved in the direction of stop 22 in order to open passage 6. First sealing body 5a, on the other hand, can be moved passively in the opposite direction, namely in the direction of second flow channel 3, in order to open passage 6. In both cases, spring 18 must be compressed and a spring force overcome.

Which sealing body 5a, 5b is passively moved against the spring force of spring 18 depends upon the pressures p1 and p2 in flow channels 2, 3 and upon the effectively active fluid engagement surfaces 7, 8. For clarity's sake, the fluid engagement surfaces of second sealing body 5b are not provided with reference characters.

A method for gradual opening and/or closing of valve 1 is described in reference to FIGS. 1-4.

Valve 1 has electromagnetic device 9 with coil 10 for generating magnetic forces, by means of which armature element 11 of valve 1 can be moved along a stroke displacement against the spring forces of spring 18.

The method comprises the following steps:

The application to coil 10 of at least one current, whose current strength I generates a magnetic force that at a specific stroke position of the armature element 11 is equal to the opposing spring force and The overshooting and/or undershooting of the current strength I.

DE 10 2015 111 561 A1 describes in reference to a pneumatic-spring valve how a magnetic-force-stroke characteristic as a whole is designed to increase similarly to a spring-force characteristic of a spring. The described valve is a normally open valve.

The spring counters the electromagnetically activated movement of the armature element with its spring force. A generally present increase is seen as advantageous because the armature element moves more slowly in the case of continually increasing or falling current strengths of the current flowing through the coil and thus a lower noise emission occurs. It is assumed in this respect that, for moving the armature element, a magnetic-stroke force characteristic for drawing the armature element counter to the spring is barely over or, as a consequence of the spring force, is barely under the spring-force characteristic.

In the context of this disclosure, it is however recognized that the movement of armature element 11 can be slowed down significantly if the magnetic-stroke force characteristic has a minimum, so that the magnetic-stroke force characteristic intersects the spring-force characteristic during operation. At the point of intersection, there is an equilibrium of forces. Armature element 11 here experiences no or almost no further acceleration. This effect affects the movement of armature element 11 as follows:

Beginning from a starting point $s_0$, if the gap 13 between armature element 11 and the pole core 12 is relatively large, and valve 1 according to FIG. 1 is closed, armature element 11, while executing a stroke of more than 4 mm, moves into the end position $s_1$ according to FIG. 2 as soon as current is conducted through coil 10. The current creates a magnetic force, by means of which armature element 11 can be pulled counter to the spring force of spring 18. In end position $s_1$, valve 1 is opened. This state is illustrated in FIG. 2.

If valve 1 again closes, the stroke or gap 13 again becomes larger. As soon as armature element 11 has exceeded or too-far exceeded an intersection point, in which there is an equilibrium of forces, it is pulled back against spring 18 because of the magnetic force that is then greater than the spring force and stabilizes at a position in which the current strength drops further and valve 1 closes. In this manner, a two-step closure of valve 1 is executed. The two-step closure takes place in an especially low-noise manner.

Figure 3:
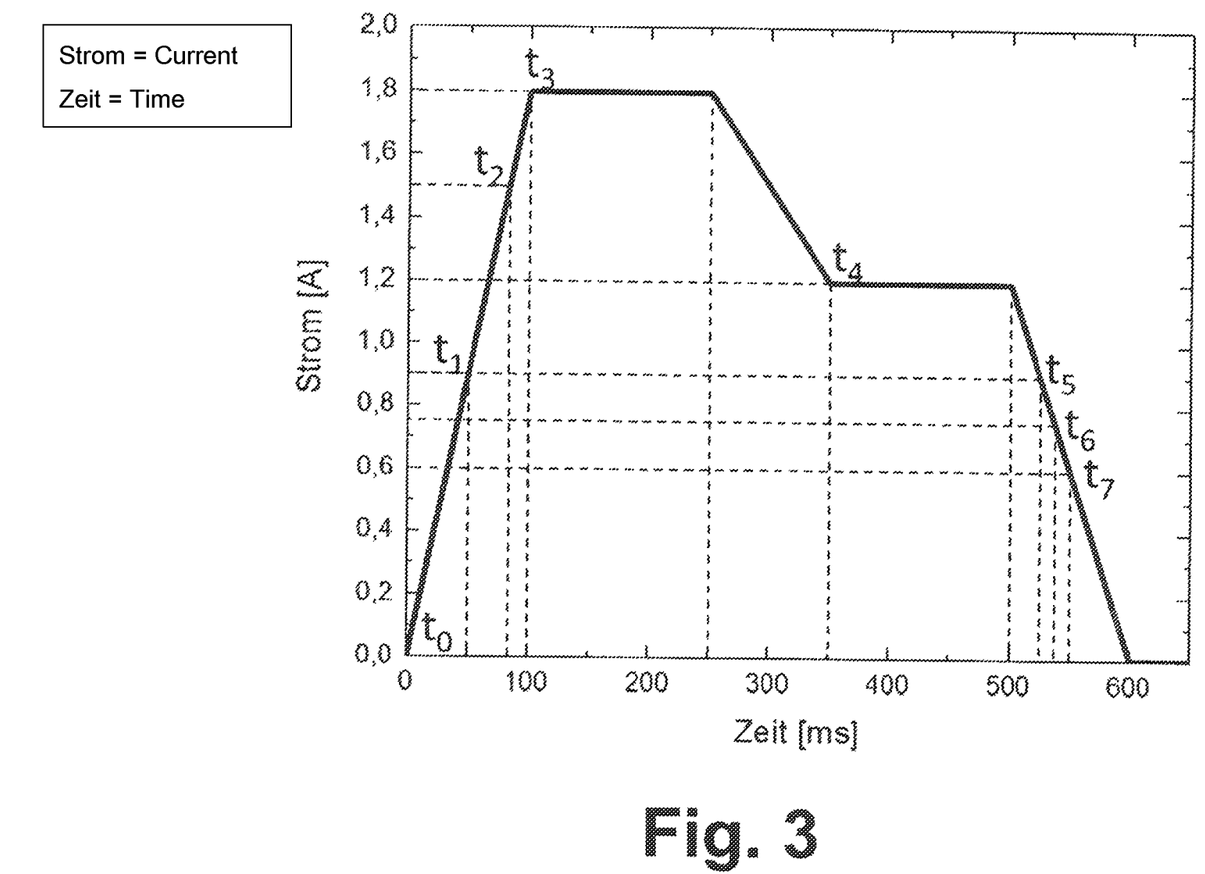
FIG. 3 shows a current-strength time curve that illustrates the application of the magnetic circuit of the valve according to FIGS. 1 and 2 as a function of the time.
Figure 4:
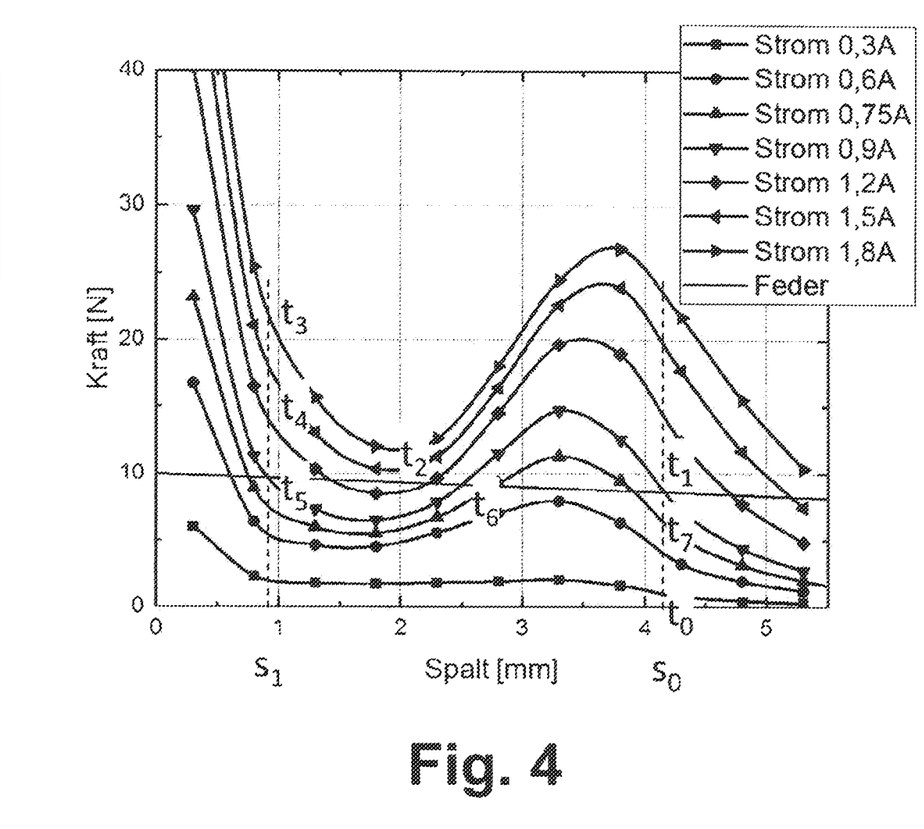
FIG. 4 shows a magnetic-force characteristic map that represents the magnetic force as a function of a gap width or of a stroke or of a stroke distance on an armature element, wherein the current strength is formulated as a variable parameter and wherein magnetic-force stroke characteristic curves intersect a spring-force characteristic curve in order to derive points, at which the armature element experiences no or essentially no acceleration.

In reference to FIG. 3 and FIG. 4, specific instants t and the current strengths I flowing at them in amperes (A), as well as specific working distances of armature element 11 are described:

At an instant $t_0$, I=0 A. The magnetic circuit 14 of coil 10 is without current, meaning no current is flowing, and spring 18 presses armature element 11 away from pole core 12. Valve 1 is closed.

At instant $t_1$, I=0.9 A. The magnetic force exerted by magnetic circuit 14 on armature element 11 and the spring force are equal. With additional increase of the current strength, armature element 11 moves from the initial position so in the direction of end position $s_1$ At instant $t_2$, I=1.2 A. Armature element 11 at instant $t_2$ is roughly at the position 2.3 mm in FIG. 4, meaning the gap width between armature element 11 and pole core 12 is approximately 2.3 mm. Because of decreased magnetic forces, there is again an equilibrium of forces between spring 18 and electromagnetic device. 9. There is no acceleration of armature element 11. Only after a further increase of the current strength is armature element 11 pulled into end position $s_1$. Armature element 11 is thus only minimally accelerated.

At instant $t_3$, I=1.8 A. This current strength ensures that armature element 11 reaches its end position even against frictional resistance.

At instant $t_4$, I=1.2 A. A drop in the current strength takes place because a magnetic holding force is still sufficiently high even at low current.

At instant $t_5$, I=0.9 A. The current strength is reduced to close valve 1. An equilibrium of forces reappears. Upon further reduction of current strength, armature element 11 is put into motion in the direction of end position so.

At instant $t_6$, I=0.75 A. The magnetic force is so small that armature element 11 is moved away from spring 18. Indeed, an equilibrium of forces again results at a gap width of approx. 2.8 cm. At a larger gap width, a resulting force even brakes armature element 11.

At instant $t_7$, I=0.6 A. At this current strength, armature element 11 can execute its complete path to initial position $s_0$. Through a further decrease of current strength to I=0 A, the end position at instant $t_0$ is reached.

Valve 1 can be controlled via a decrease of current, wherein a high current strength of approx. 0.5 A to 2 A is used for pulling armature element 11, and wherein a lower current strength of approx. 0.5 A to 1.2 A is used if armature element 11 is close to pole core 12. The current strengths I indicated here can be variably selected and also depend upon the spring constant.

By means of exceeding or undershooting or reducing the current strength, armature element 11 or assigned sealing body 5a can be moved very slowly and only minimally accelerated. By selecting a plurality of current strengths I in succession at which there is an equilibrium of forces, a gradual movement of armature element 11 or of sealing body 5a can be accomplished. Using the method described here, also the step of a minimization of the acceleration of armature element 11, in particular, can be executed.

Valve 1 described here occupies less space and can have a coil 10 with less weight than a valve in which no current reduction is employed.

Valve 1 described here has a housing 24, from which only two flow channels 2, 3 protrude. Specifically, flow channels 2, 3 are oriented orthogonally to each other.

Housing 24 has two housing parts, between which a rolling diaphragm 20 is clamped, wherein electromagnetic device 9 and first flow channel 2 are assigned to one housing part and wherein second flow channel 3 is assigned to the other housing part.

Supports are assigned to flow channels 2, 3, to which the lines can be flange-mounted.

It is to be understood that the description of the foregoing exemplary embodiment(s) is (are) intended to be only illustrative, rather than exhaustive. Those of ordinary skill will be able to make certain additions, deletions, and/or modifications to the embodiment(s) of the disclosed subject matter without departing from the spirit of the disclosure or its scope.

What is claimed is:

1. A valve comprising:
   a first flow channel and a second flow channel;
   a passage connecting together the first flow channel and the second flow channel;
   a housing;
   a sealing device disposed in the housing for connecting the first and second flow channels in a fluid-conducting manner and for separating the first and second flow channels from one another in a fluid-blocking manner, wherein the sealing device has first and second sealing bodies for opening and closing the passage and wherein the first sealing body has a fluid engagement surface against which overpressure may act to passively move the first sealing body to open the passage; and
   an electromagnetic device that is operable when energized to actively move the first sealing body to open the passage;
   wherein the first and second sealing bodies are each movable relative to the housing; and
   wherein the sealing device has only one releasable sealing seat, at which the first and second sealing bodies abut each other in order to seal the passage.

2. The valve according to claim 1, wherein the first sealing body can be moved relative to the electromagnetic device or parts thereof and/or is detached at least in sections from the electromagnetic device or parts thereof, so that the first sealing body can be moved independently from the movement of the electromagnetic device or from the movements of parts thereof in a fluid controlled manner.

3. The valve according to claim 1, wherein the electromagnetic device has a coil and an armature element that can be actively moved by which the first sealing body can be directly or indirectly moved when a magnetic field is generated.

4. The valve according to claim 3, wherein the armature element has a rod element extending therefrom that engages into a recess of the first sealing body.

5. The valve according to claim 1, wherein the first sealing body can be moved to open the passage by the electromagnetic device against a spring force of a spring.

6. The valve according to claim 1, wherein the first and second sealing bodies are biased against each other by a spring, wherein the passage can be opened by the separation of the first and second sealing bodies from one another, and wherein the passage is sealable by contact between the first and second sealing bodies.

7. The valve according to claim 1, wherein the passage extends through the second sealing body, and wherein the valve further comprises:
   a spring attachment secured to the first sealing body; and
   a spring disposed between the spring attachment and the second sealing body, the spring applying a spring force that biases the first sealing body toward the second sealing body to close the passage.

8. The valve according to claim 7, wherein the second sealing body comprises a rolling diaphragm, wherein the second sealing body can abut a support shoulder in a manner that prevents movement so that the first sealing body can be moved relative to the second sealing body and can be separated therefrom, and wherein the spring attachment can abut a stop in a manner that prevents movement of the first sealing body so that the second sealing body can be moved relative to the first sealing body and is separable therefrom.

9. The valve according to claim 7, wherein the electromagnetic device comprises a coil and an armature having a rod element extending therefrom, the rod element having an end portion movably disposed in a recess of the first sealing body; and
   wherein the armature is movable by energization of the coil from a disengaged position to an engaged position, wherein when the armature is in the disengaged position, the end portion of the rod element is spaced from an interior wall of the first sealing body inside the recess, and wherein when the armature is in the engaged position, the end portion of the rod element abuts the interior wall inside the recess; and
   wherein the movement of the armature from the disengaged position to the engaged position causes the rod element to push against the interior wall of the first sealing body, thereby moving the first sealing body against the bias of the spring and away from the second sealing body to open the passage.

10. The valve according to claim 7, wherein the electromagnetic device is operable to apply a force on the first sealing body when the electromagnetic device is provided with electric current, wherein the force applied to the first sealing body by the electromagnetic device is opposite in direction to the spring force and increases as the amount of electric current provided to the electromagnetic device increases, and wherein when the electric current exceeds a certain strength, the force applied to the first sealing body by the electromagnetic device exceeds the spring force and moves the first sealing body to open the passage.

11. The valve according to claim 1, further comprising a spring that applies a spring force that biases the first sealing body to close the passage; and
   wherein when the electromagnetic device is not energized: the first sealing body is passively moved by an overpressure acting against its fluid engagement surface to open the passage, and when the overpressure is reduced, the spring force moves the first sealing body to close the passage.

* * * * *